J. A. DAUBENSPECK.
LUBRICATOR FOR ENGINE CYLINDERS.
APPLICATION FILED JUNE 26, 1908.
928,906.
Patented July 20, 1909.
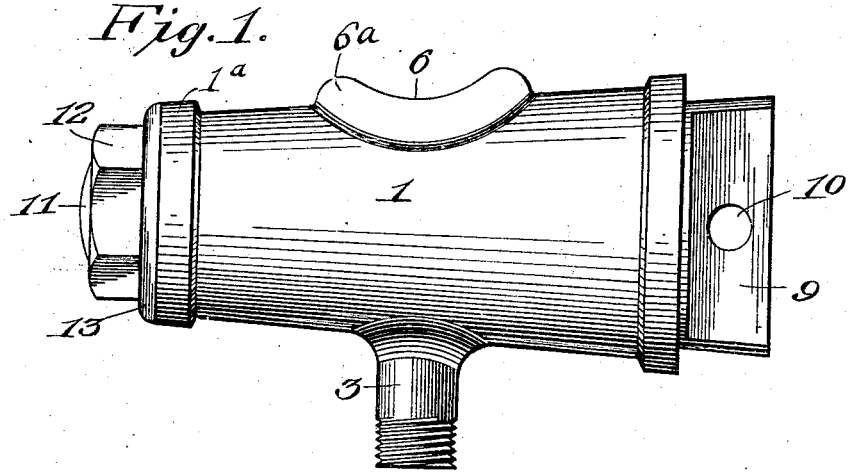
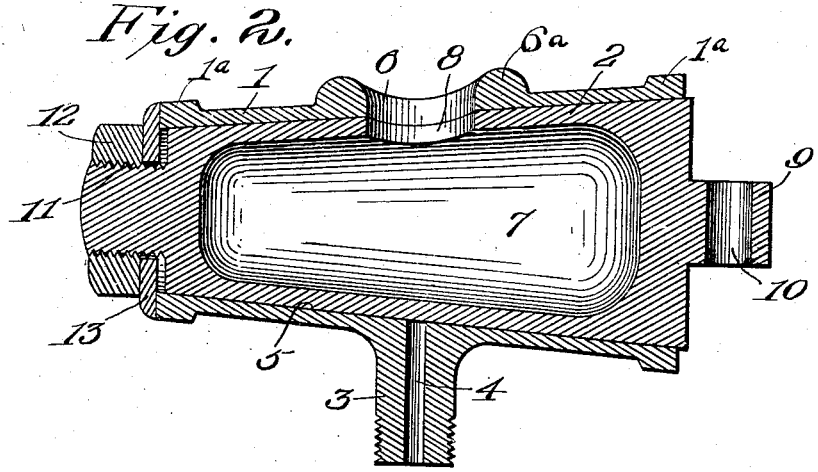
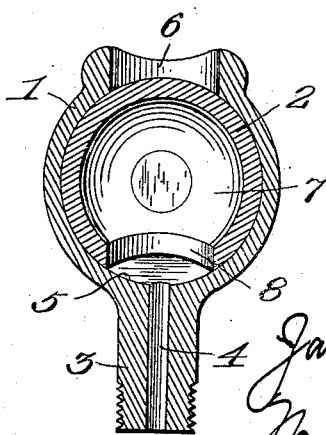
Witnesses
James F. Crown
M. L. Skinner
Inventor
James A. Daubenspeck
By Watson E. Coleman
Attorney

UNITED STATES PATENT OFFICE.

JAMES A. DAUBENSPECK, OF AMOS, WEST VIRGINIA.

LUBRICATOR FOR ENGINE-CYLINDERS.

No. 928,906.      Specification of Letters Patent.      Patented July 20, 1909.

Application filed June 26, 1908. Serial No. 440,507.

*To all whom it may concern:*

Be it known that I, JAMES A. DAUBENSPECK, a citizen of the United States, residing at Amos, in the county of Marion and State of West Virginia, have invented certain new and useful Improvements in Lubricators for Engine-Cylinders, of which the following is a specification, reference being had to the accompanying drawings.

This invention relates to improvements in lubricators for engine cylinders and the like.

The object of the invention is to provide a simple and inexpensive lubricant cup which may be effectively used upon engine cylinders and which may be conveniently refilled.

With the above and other objects in view, the invention consists of the novel features of construction and the combination and arrangement of parts hereinafter fully described and claimed, and illustrated in the accompanying drawings, in which—

Figure 1 is a front elevation of the improved lubricator; Fig. 2 is a longitudinal section showing the cup in its open position; and Fig. 3 is a transverse section showing the cup in its closed position.

The invention comprises a horizontally disposed body or casing 1 made hollow to receive a rotary lubricant container or cup 2 and provided upon the center of its bottom with a screw threaded attaching stem 3 formed with an oil passage 4. The stem 3 is adapted to be screwed into an engine cylinder and the upper end of its passage 4 opens into the longitudinally tapered bore 5 formed in the casing 1. The ends of the casing 1 are open and reinforced by external annular ribs 1ª and in the top of the casing and directly opposite the passage 4 in the stem 3 is a large opening 6 surrounded by an external reinforcing rib 6ª. The lubricant cup 2 is in the form of a rotary plug tapered longitudinally and adapted to snugly fit the bore 5, which latter is ground to insure the close fitting of said parts and thereby prevent the escape of steam. The cup or plug 2 is made hollow with a large cavity 7 adapted to hold a quantity of tallow, oil, or other lubricant. A filling opening 8 is formed in the center of one side of the cup and may be brought opposite the filling opening 6 in the casing 1 to permit of the introduction of the lubricant into the cavity 7 or turned opposite the passage 4 in the stem so as to throw said passage into communication with the cavity 7. The large end of the cup is formed with a flat faced lug or projection 9 extending transversely across the same which is adapted to be gripped by the jaws of a wrench and which may also be formed with a transverse hole 10 to receive a turn-bar. The small end of the cup 2 is reduced and externally screw threaded to provide a stem 11 for the reception of a retaining nut 12 and a washer 13, the latter being arranged between the nut and the adjacent end of the casing 1, as clearly shown in Fig. 2.

When the lubricator is applied to an engine cylinder and it is desired to fill its cup 2 the latter is turned to bring its opening 8 into register with the opening 6 in the top of the casing 1 so that the tallow, oil or other lubricant may be passed through said openings and into the cavity 7. When the parts are in this position, as shown in Fig. 2, it will be seen that the solid portion of the cup closes the passage 4 and effectively prevents the escape of steam. After the lubricant has been placed in the cavity 7 the cup is closed by turning it to the position shown in Fig. 3, in which it will be noted that the solid portion of the cup closes the opening 6 and that the opening 8 permits the lubricant in the cavity 7 of the cup to pass through the passage 4 and to the engine cylinder. By making the cup in the form of a rotary plug with a large cavity to hold a quantity of lubricant, an exceedingly inexpensive and convenient lubricator for an engine cylinder is produced. This construction, it will be observed, dispenses with the necessity of valves and closures found upon lubricators now used upon engine cylinders.

Having thus described the invention what is claimed is:

The hereindescribed lubricator for an engine cylinder comprising a longitudinally tapered tubular body having terminal external annular reinforcing ribs and formed with a ground bore tapering longitudinally from one end to the other, said body being open at its ends and formed in its top with a centrally arranged inlet opening and an annular reinforcing rib surrounding the same and upon its bottom with an integral attaching stem having an externally screw threaded lower extremity and an outlet passage extending through the same and in communication with the bore of the body, a lubricant cup in the form of a longitudinally tapered plug having a ground exterior surface rotatable in the ground bore of said body, said plug being hollow and having in the center of its side an opening adapted to be moved into communication with either the inlet opening in the top of the body or the outlet passage in the stem of the latter, the large end of said plug being formed with an integral central transverse flat-faced lug extending entirely across the same and having a central opening and the small end of said plug being formed with a reduced externally screw threaded stem, a washer upon said stem and engaged with the small end of the body and a nut upon said stem and engaged with the washer, as and for the purposes specified.

In testimony whereof I hereunto affix my signature in the presence of two witnesses.

JAMES A. DAUBENSPECK.

Witnesses:
J. C. ROSE,
A. L. RUSH.